(12) United States Patent
DeCusatis et al.

(10) Patent No.: US 7,885,540 B2
(45) Date of Patent: Feb. 8, 2011

(54) METHODS AND APPARATUS FOR OPTICAL MODULATION AMPLITUDE MEASUREMENT

(75) Inventors: Casimer DeCusatis, Poughkeepsie, NY (US); Daniel M. Kuchta, Patterson, NY (US); Jeremy Daniel Schaub, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 12/114,374

(22) Filed: May 2, 2008

(65) Prior Publication Data

US 2009/0245789 A1 Oct. 1, 2009

Related U.S. Application Data

(63) Continuation of application No. 11/068,661, filed on Feb. 28, 2005, now abandoned.

(51) Int. Cl.
*H04B 10/08* (2006.01)
*G01M 11/00* (2006.01)

(52) U.S. Cl. ............................. 398/25; 398/9; 398/23; 398/38; 398/135; 398/140; 398/183; 398/186; 372/38.1; 372/29.01; 372/29.02

(58) Field of Classification Search ............ 398/9, 398/16, 22–25, 38, 135, 139–141, 182, 183, 398/186; 372/29.01, 29.02, 31, 38, 38.1, 372/38.01, 38.02, 38.04; 324/158.1, 756, 324/767; 356/3, 73.1, 124.5, 402
See application file for complete search history.

(56) References Cited

U.S. PATENT DOCUMENTS

| 5,850,409 | A | 12/1998 | Link |
| 6,907,055 | B2 * | 6/2005 | Morley et al. ............... 372/38.1 |
| 6,922,231 | B1 * | 7/2005 | Wang et al. ................ 356/73.1 |
| 7,333,521 | B1 * | 2/2008 | Mohan ..................... 372/29.02 |
| 7,502,568 | B1 * | 3/2009 | Mohan ........................ 398/197 |
| 2003/0090289 | A1 | 5/2003 | Morley et al. |
| 2004/0136729 | A1 * | 7/2004 | Robinson et al. ............ 398/183 |

(Continued)

OTHER PUBLICATIONS

MAXIM: "Optical Receiver Performance Evaluation", Application Note 1938 HFAN-3.0.2, Mar. 2003, pp. 1-8.*

(Continued)

*Primary Examiner*—Li Liu
(74) *Attorney, Agent, or Firm*—Anne V. Dougherty; Ryan, Mason & Lewis, LLP

(57) ABSTRACT

Techniques for measuring optical modulation amplitude (OMA) are disclosed. For example, a technique for measuring an OMA value associated with an input signal includes the following steps/operations. The input signal is applied to a photodetector, wherein the photodetector is calibrated to have a given responsivity value R, and further wherein the photodetector generates an output signal in response to the input signal. The output signal from the photodetector is applied to a radio frequency (RF) power meter, wherein the RF power meter measures the root mean squared (RMS) power value of the output signal received from the photodetector. The OMA value associated with the input signal is determined in response to the root mean squared (RMS) power value measured by the RF power meter. The OMA value may be determined as a function of a factor F derived from a relationship between an amplitude of a data signal and the RMS value of the data signal.

20 Claims, 4 Drawing Sheets

U.S. PATENT DOCUMENTS

2004/0202476 A1* 10/2004 Woolf et al. .............. 398/135
2005/0213621 A1* 9/2005 Varga et al. .............. 372/38.02

OTHER PUBLICATIONS

Aeroflex: "Power Meters: 6970 RF Power Meter", Feb. 2004, pp. 1-4.*

PHYS245: Root-Mean-Square (rms) Quantities, www.art-sci.udel.edu, Feb. 27, 2005, pp. 1-2.*

XX-00-200x Physical Interface-2 3.5, pp. 118-122.

IEEE Draft P802.3ae/D4.2, Draft Supplemental to IEEE Std. 802.3, pp. 469-473, Mar. 20, 2002.

* cited by examiner

FILTER SHAPES

10Gb/s SIGNAL, 5GHz BW, ZETA = 0.5

METHODS AND APPARATUS FOR OPTICAL MODULATION AMPLITUDE MEASUREMENT

CROSS-REFERENCE TO RELATED APPLICATION(S)

This application is a continuation of U.S. application Ser. No. 11/068,661 filed on Feb. 28, 2005, the disclosure of which is incorporated herein by reference.

FIELD OF THE INVENTION

The present invention relates to optical network parameter measurement techniques and, more particularly, to techniques for measuring optical modulation amplitude.

BACKGROUND OF THE INVENTION

The Fibre Channel (FC) standards are an American National Standards Institute (ANSI) standards set that defines a common transport system for use with different protocols or applications. The initial core FC standard is identified as X.3230-1994-Fibre Channel Physical and Signaling Standard (FC-PH), the disclosure of which is incorporated by reference herein.

Until recently, FC optical transceivers were specified with an acceptable range of optical receiver sensitivity and transmitter output measured in terms of average optical power at a minimum extinction ratio level. When an optical link failure occurred, fault determination procedures typically called for measurement of the average optical power at both transmit and receive ends of the link. If the transceiver power levels were within specified limits, but the link continued to fail, then the problem was attributed to the optical cable plant. It was possible to measure segments of the link using an average optical power meter until the fault was localized and corrected. On the other hand, a defective transceiver could be identified by measuring its optical output and input power levels. If the link was delivering acceptable power levels and errors continued to occur, the failure was assumed to reside in the optical receiver.

Recently, however, the FC standard changed its specifications. The change is found in FC-PI-2, Revision 4, Appendix A.5, the disclosure of which is incorporated by reference herein. Rather than including receiver sensitivity at a given extinction ratio, the Standard now defines a new parameter, Optical Modulation Amplitude (OMA), which refers to the optical amplitude of the signal, i.e., the difference in amplitude between a logic 1 and a logic 0. The OMA is a function of both received average optical power, $P_{AVE}$, and extinction ratio, E:

$$OMA_{Linear} = 2 * P_{AVE} * \left(\frac{E-1}{E+1}\right) \text{ in linear units}$$

or $$OMA_{log} = 10 * \log10\left(\frac{2 * P_{AVE} * \left(\frac{E-1}{E+1}\right)}{0.001}\right) \text{ in units of dBm with } P_{AVE} \text{ in Watts.}$$

The extinction ratio is the linear ratio of optical power between a logic level 1 and 0 measured under fully modulated conditions. This Standards change means that it is no longer possible to determine whether an optical transceiver is within specification simply by measuring the average optical power input to the receiver. The OMA, as specified in the Standard, requires measurements of an extinction ratio that, in accordance with existing measurement approaches, can only be made accurately in a lab or manufacturing environment with an expensive digital oscilloscope or similar equipment.

This situation currently affects all FC components, as well as IBM Corporation's zSeries™ Fibre Connection (FICON) links (which use the FC physical layer). Also, the practice of using OMA-based specifications already exists in the 10 Gigabit/second Ethernet (10G Ethernet) Standard, the disclosure of which is incorporated by reference herein, as will be explained below. The OMA-based specifications are likely to extend into higher data rate standards or higher fiber count links in the future, as well as other protocols besides FC and 10G Ethernet.

Since the two standards specify an OMA measurement technique that is quite difficult and expensive to perform in the field by installation/repair personnel, it would be desirable to have a low cost portable OMA measurement tool which can be correlated with the various standards.

The 10G Ethernet Standard specifies a relative intensity noise (RIN) OMA measurement using a photodetector and a power meter. Such an approach is a ratio measurement of noise power to signal power and thus does not calibrate the photodetector to obtain a true OMA reading.

Hewlett Packard (Palo Alto, Calif.) produced the 8151A Optical Pulse Power Meter which was capable of measuring OMA on square wave signals up to 250 MegaHertz (MHz). This unit used separate high and low peak detection circuits with variable ramps to determine the high and low optical levels.

U.S. Pat. No. 5,850,409 and U.S. Patent Application No. 2003/0090289A1 both describe a method and circuit for "measuring OMA." But, in actuality, these methods and circuits are configured for maintaining the internal OMA of a transmitter over temperature after the transmitter has been appropriately set up by a user. These methods and circuits do not and can not report a calibrated OMA.

SUMMARY OF THE INVENTION

Principles of the present invention provide techniques for measuring optical modulation amplitude (OMA).

For example, in one aspect of the invention, a technique for measuring an optical modulation amplitude (OMA) value associated with an input signal includes the following steps/operations. The input signal is applied to a photodetector, wherein the photodetector is calibrated to have a given responsivity value R, and further wherein the photodetector generates an output signal in response to the input signal. The output signal from the photodetector is applied to a radio frequency (RF) power meter, wherein the RF power meter measures the root mean squared (RMS) power value of the output signal received from the photodetector. The OMA value associated with the input signal is determined in response to the root mean squared (RMS) power value measured by the RF power meter.

Further, the input signal may be applied to the photodetector from a fiber optic link. The photodetector may generate a photocurrent in response to the input signal. The photocurrent may be converted to an average optical power value based on the given responsivity value R. The determining step/operation may further include converting the RMS power value to the OMA value. Conversion may be performed in accordance with a factor F which may be derived from a relationship between an amplitude of a data signal and the RMS value of the data signal and a frequency response of the measuring system.

Also, the input signal and the OMA value may be compatible or desired to be made or verified with the FC Standard and/or the 10G Ethernet Standard.

Still further, the photodetector may include a photodiode. The step/operation of determining the OMA value may be performed in accordance with a processor or a look-up table. The technique may also include the step/operation of determining an extinction ratio based on the average optical power value and the OMA value.

In another aspect of the invention, a technique for measuring an OMA value associated with an input signal includes obtaining the input signal, and determining the OMA value associated with the input signal by converting a root mean squared (RMS) power value measured from the input signal as a function of a factor F, wherein an optimum value for factor F is a value which when used to convert from RMS power to OMA gives an OMA value that is in substantial agreement with an OMA value that would have been obtained using a standards-specified method.

Accordingly, principles of the present invention provide techniques that enable measurement of OMA in a variety of settings and applications. For example, the inventive techniques may be used for field (e.g., customer location) measurement of OMA. Also, by way of further example, the inventive techniques may be used for optical component manufacturing measurements, which may lower costs through lower equipment costs and faster testing time.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
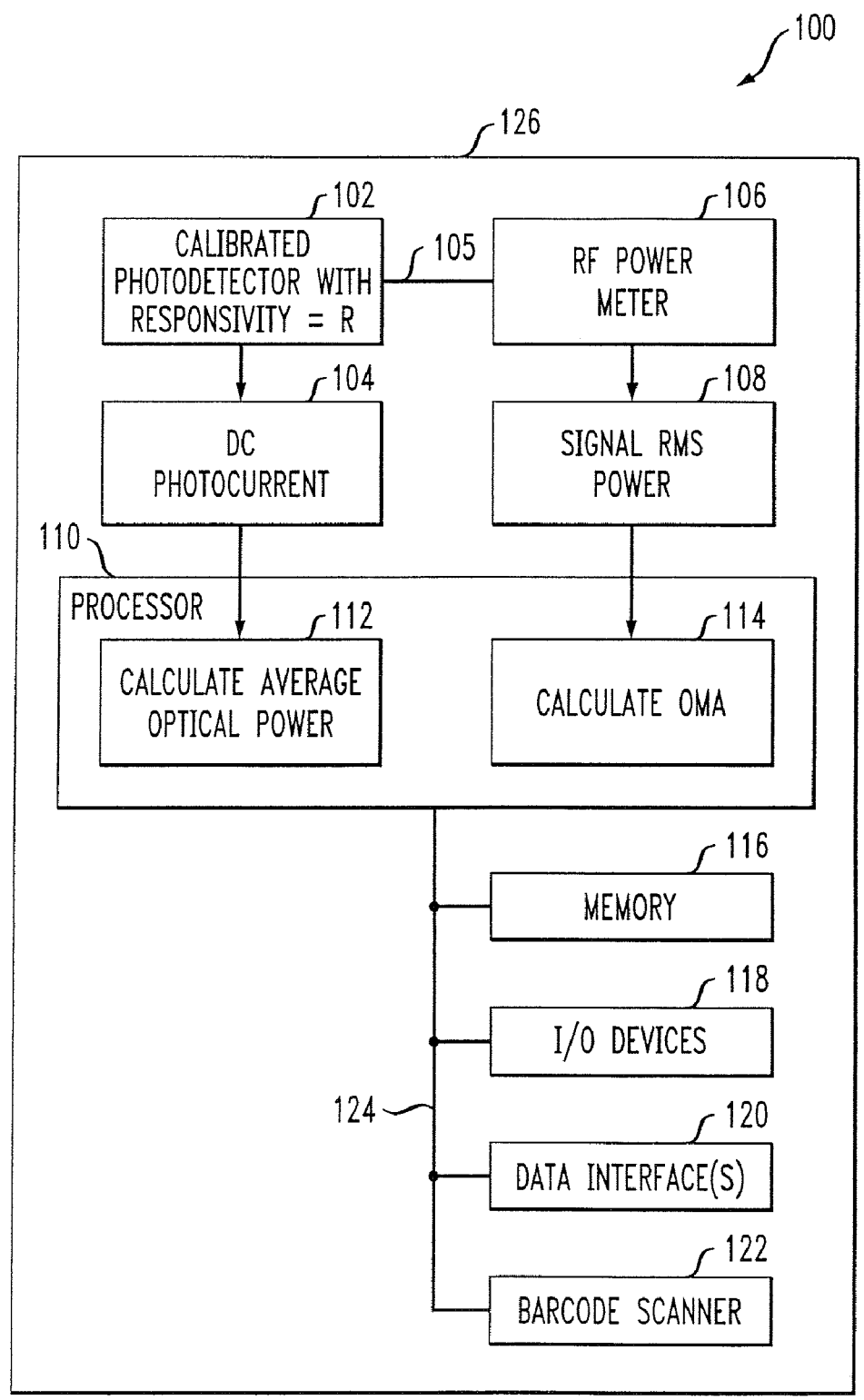
FIG. 1 is a diagram illustrating an optical modulation amplitude meter, according to an embodiment of the present invention.

While illustrative embodiments will be described below in the context of the FC standard, it is to be understood that principles of the invention are not limited to use with the FC standard and thus are more generally applicable for use with any suitable high data rate transport systems, e.g., FICON (Fibre Connection), 10G Ethernet, etc. Furthermore, while principles of the invention may be suitable for use in fault determination, they are not limited to use therein. That is, OMA measurement techniques of the invention may be suitable for data communications standards conformance testing and verification, field applications, manufacturing applications, etc.

As will be described in illustrative detail below, principles of the invention provide a new, portable, low cost measurement tool which can directly determine OMA levels on a fiber optic link and correlate them with various standards.

In one embodiment, the portable OMA meter includes a calibrated photodetector, a radio frequency (RF) power meter, and a processor. The photodetector is connected directly to the RF power meter in most situations, although amplifiers or attenuators could be placed between the photodetector and the RF power meter to handle situations of very weak or very strong signals respectively. The photodetector has a responsivity, R, which is calibrated at several wavelengths of interest, e.g., 850 nanometers (nm), 1310 nm and 1550 nm. It is assumed that the direct current (DC) and alternating current (AC) responsivity are the same; although, if different, one skilled in the art would readily appreciate how to adjust the calibration. Further, the AC responsivity difference from DC could be accounted for in the processor. It is to be appreciated that calibrated photodetectors may be purchased or one ordinarily skilled in the art will realize how to calibrate a photodetector using well-known calibration techniques, e.g., National Institute of Standards and Technology (NIST) calibration services.

It is to be understood that the photodetector could be, for example, a gallium arsenide (GaAs) or an indium gallium arsenide (InGaAs) positive-intrinsic-negative (PIN) photodiode or a metal-semiconductor-metal (MSM) photodetector. In fact, suitable photodetectors other than a photodiode may be employed in accordance with the techniques of the invention.

The direct current (DC) photocurrent of the photodetector, $I_{DC}$, is measured and converted to average optical power using the simple relationship:

$$P_{AVE} = \frac{I_{DC}}{R}.$$

The RF power meter measures the root mean squared (RMS) electrical power of the signal from the photodetector into a 50 Ohm load which is converted to OMA through the following relationship:

$$OMA = 10 * \log 10 \left( \frac{I_{PEAK}}{R * 0.001} \right)$$
$$= 10 * \log 10 \left( \frac{F * \sqrt{I_{RMS}^2}}{R * 0.001} \right)$$
$$= 10 * \log 10 \left( \frac{F * \sqrt{\left(0.001 * 10^{\left(\frac{RF_{RMS}}{10}\right)} / 50\right)}}{R * 0.001} \right)$$

This relationship is explained in the following way. The portion of the equation under the radical converts the measured RF RMS power, $RF_{RMS}$, from dBm into the square of the RMS signal current, $I_{RMS}^2$. The RMS signal current is then converted to a peak photocurrent, $I_{PEAK}$, by multiplying by a factor F. This factor F comes from the relationship between the amplitude of a data signal (e.g., a square wave signal) and the RMS value of the data signal. This factor will be discussed in greater detail below. However, in one embodiment, factor F may be equal to two or about two, e.g., 2.10. However, other suitable factors may be employed.

The peak current is converted to linear OMA by dividing by the responsivity, R, of the photodetector. The linear OMA is finally converted to OMA in units of dBm by dividing by 1 milliwatt (0.001 Watt) and taking "10-log".

Furthermore, using the determined $P_{ave}$ and OMA values, the extinction ratio can be calculated. Thus, principles of the invention provide a portable extinction ratio measurement tool as well.

Referring initially to FIG. 1, a diagram illustrates an optical modulation amplitude meter, according to an embodiment of the present invention. As shown, OMA meter 100 includes a calibrated photodetector 102 which generates DC photocurrent 104 and AC photocurrent 105, RF power meter 106 which measures signal RMS power 108, and processor 110 which, in response to outputs 104 and 108, performs average optical power calculation 112 and OMA calculation 114. In addition, OMA meter 100 includes a memory 116, input/output (I/O) device(s) 118, data interface(s) 120 and barcode scanner 122, each operatively coupled to processor 110 via a suitable computer bus 124. Further, as shown, the components of the OMA meter are contained in a portable housing 126.

The term "processor" as used herein is intended to include any processing device, such as, for example, one that includes a CPU (central processing unit) and/or other processing circuitry. By way of further example, the processor could include one or more application-specific integrated circuits (ASICs) or one or more field programmable gate arrays (FPGAs). It is also to be understood that the term "processor" may refer to more than one processing device and that various elements associated with a processing device may be shared by other processing devices.

Processor 110 may also have associated therewith memory 116 such as, for example, RAM, ROM, a fixed memory device (e.g., hard drive), a removable memory device (e.g., diskette), flash memory, etc. Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Also, processor 110 may also have associated therewith one or more input devices (e.g., keypad, etc.) for entering data to the processing unit, and/or one or more output devices (e.g., speaker, display, etc.) for presenting results associated with the processing unit. Such devices are referred to as I/O device(s) 118. Also, photodetector 102 and RF power meter 106 may have their own I/O devices (e.g., displays) that may be used in accordance with OMA meter 100.

Further, processor 110 may also have associated therewith one or more data interface(s) 120 for formatting data obtained in accordance with the operations performed by OMA meter 100 into one or more data formats for transfer (upload) to a source remote from the meter. For example, results of computations such as the average optical power calculation (112) and the OMA calculation (114) may be formatted to a particular format for transfer to a computing system to which OMA meter 100 may be operatively coupled.

Still further, processor 110 may also have associated therewith bar scanner 122 for use in reading a uniform product code (UPC) label affixed to a particular component that OMA meter 100 is being used to measure. For example, the barcode scanner could scan the UPC on an optical transceiver such that any readings taken for that transceiver are stored in accordance with an index number associated with the transceiver, e.g., a serial number. This would make for easy retrieval and reference of the obtained measurements.

In one illustrative embodiment, a portable OMA meter has been realized using a New Focus (San Jose, Calif.) model 1481 photodetector, and a Hewlett Packard HP437B RF power meter with HP8484A power head. The calculation of OMA in this case is performed by using a programmed spreadsheet cell (e.g., Microsoft Excel) when the power meter reading was recorded manually or with a LabView (National Instruments Corporation, Austin, Tex.) program when the power meter was read by a computer through the general purpose interface bus (GPIB) port.

Figure 2:
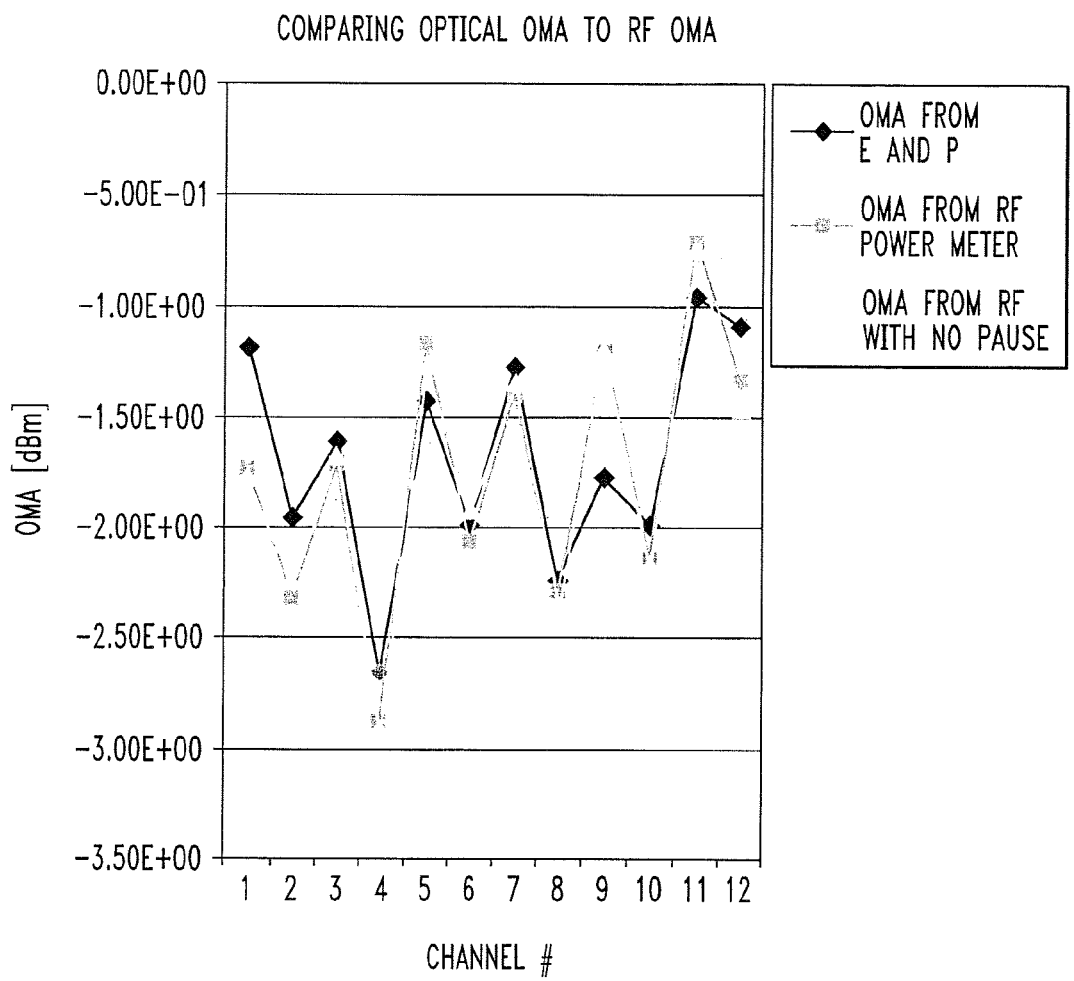
FIG. 2 is a diagram illustrating a comparison of the 10G Ethernet Standard optical modulation amplitude measurement and an optical modulation amplitude measurement, according to an embodiment of the present invention.

To verify the use of this technique, the OMA of each channel of a 12 channel parallel optical transmitter was measured using the method specified in section 52.9.5 of the physical layer specification of 10 Gb/s Ethernet (the standard method) and compared to the OMA calculated from the RMS RF power meter reading of the same signal. The graph of FIG. 2 shows the measured results with the standard method in diamonds and two measurements using the RF power meter, in accordance with the present invention, in triangles and squares. The difference between the Standard method and this method is less than 0.5 dB or 11%. The difference between the two curves using the RF power meter was an experiment to see if the result was affected by adding some dwell time to the measurement. In this case, dwell time did not appreciably affect the results.

This particular implementation was capable of measuring OMA down to the level of −15 dBm (noise floor) and up to +7 dBm (saturation level).

In this particular implementation, the dc photocurrent was not monitored nor verified against average optical power, as this was considered too trivial since the New Focus model 1481 provides a calibrated dc photocurrent output on its front panel.

In this particular implementation, the OMA meter was not portable due to the RF power meter, however; Agilent Technologies (Palo Alto, Calif.) offers this power meter with an optional battery pack for field measurements. Aeroflex Inc. (Plainview, N.Y.) also offers a portable RF power meter model no. 6970 that may be employed.

One main advantage to measuring the OMA with an RF power meter is the sheer simplicity. One does not have to set up and trigger a high speed scope and then take histograms on separate one and zero levels to get the OMA. The OMA meter of the invention simply needs an optical signal. In practice, it has been found that this method also works on full speed modulated signals, not only square wave patterns. This has the advantage for field measurements where the service technician may not be able to configure an I/O port to generate a square wave pattern when servicing or diagnosing a system that is in use.

Size is another advantage. This particular implementation takes significantly less space and weight than a high speed oscilloscope. It is anticipated that a unit designed specifically for the field could be made even more compact.

Cost is another advantage. The current cost of the components in the particular implementation was about $1/7^{th}$ of the cost of a high speed oscilloscope. It is anticipated that further cost reductions could be realized when making a field portable unit.

This technique provides a calibrated measure of the OMA which can be used to check for compliance with various standards.

This measurement technique does not depend on the data rate of the signal. Therefore, it is extendable from existing 1 Gb/s and 2 Gb/s modules up to 10 Gb/s and beyond, limited only by the bandwidth of the photodetector and RF power meter.

Figure 3:
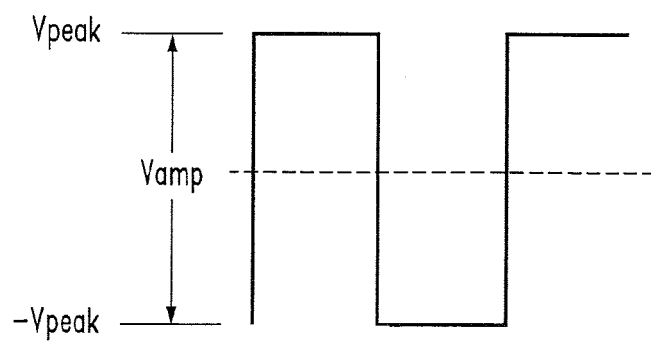
FIG. 3 is a diagram illustrating an ideal square wave pattern with definition of terms.

The factor F used in the calculation of OMA from the RMS value of RF power comes from the relationship of the RMS value of a data signal, in this case, a periodic square wave signal, to its peak to peak amplitude.

$$V_{RMS} = \sqrt{\frac{1}{T}\int_0^T v^2(t)\,dt}$$
$$= \sqrt{\frac{1}{T}\int_0^{T/2}(V_{peak})^2\,dt + \frac{1}{T}\int_{T/2}^T(-V_{peak})^2\,dt}$$
$$= \sqrt{\frac{1}{T}\int_0^{T/2}\left(\frac{V_{amp}}{2}\right)^2 dt + \frac{1}{T}\int_{T/2}^T\left(\frac{-V_{amp}}{2}\right)^2 dt}$$
$$= \sqrt{\frac{1}{T}\frac{T}{2}\frac{V_{amp}^2}{4} + \frac{1}{T}\frac{T}{2}\frac{V_{amp}^2}{4}}$$
$$= \sqrt{\frac{V_{amp}^2}{4}} = \frac{V_{amp}}{2}$$

or $V_{amp} = 2*V_{RMS}$ for an ideal square wave pattern, using the terms illustrated in FIG. 3. For an ideal sine wave, $V_{amp} = 2\sqrt{2}*V_{RMS}$. This would suggest that for real data patterns, which may have overshoot, undershoot and/or inter symbol interference, the exact relationship between the RMS value and the peak to peak signal amplitude might lie somewhere between 2 and $2\sqrt{2}$.

To investigate this, simulations were performed to calculate the optimum factor F given realistic square wave patterns that had been filtered with varying bandwidths and filter shapes. The optimum value of F is the value which when used to convert from RMS power to OMA in accordance with the present invention will give an OMA value that is in agreement with the OMA value that would have been obtained using one of the Standards-specified methods (e.g., FC or 10G Ethernet). The filters are meant to represent the variety of system responses that are likely to be encountered in the field.

Figure 4A:
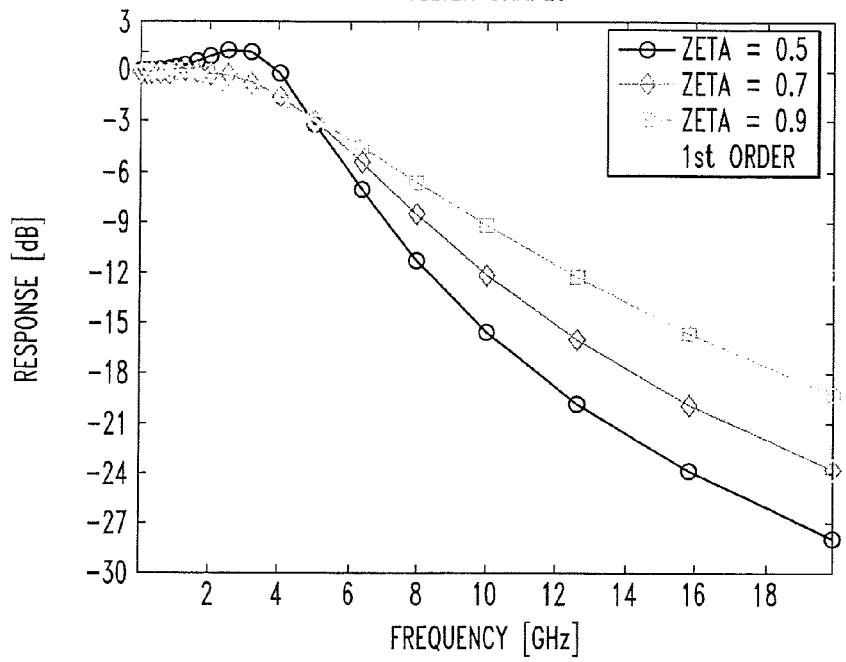
FIG. 4A is a diagram illustrating the frequency response of various filters, which represent different system responses, used in root mean square simulations.
Figure 4B:
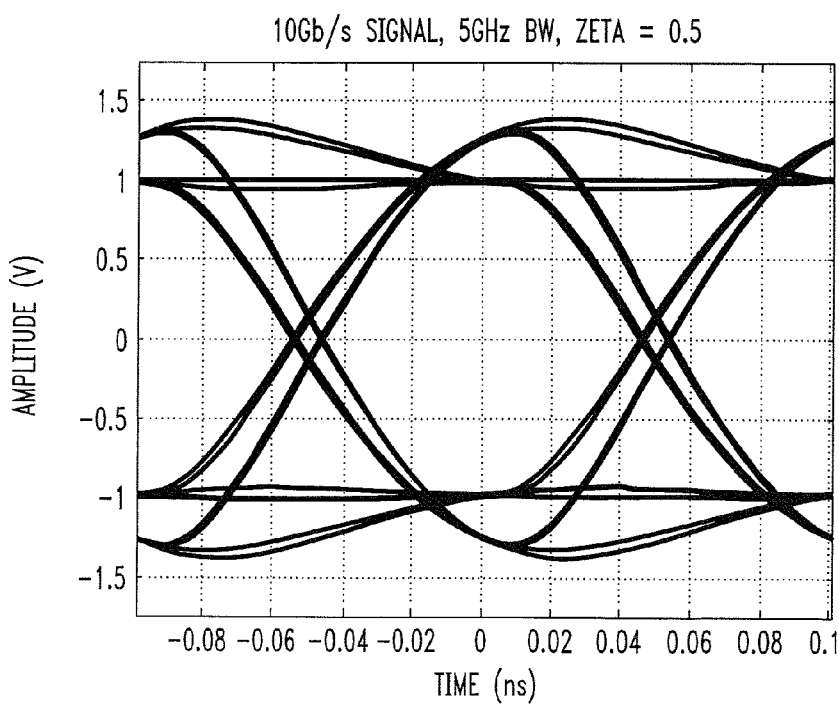
FIG. 4B is a diagram illustrating a representative eye pattern resulting from the use of one of the filters of FIG. 4A.

FIG. 4A shows an example set of filters and FIG. 4B shows a simulated eye diagram using one of those filters. Note that there is a significant amount of overshoot in this eye which is typical of many vertical cavity surface-emitting laser (VCSEL) transmit eyes at 10 Gb/s.

Figure 5A:
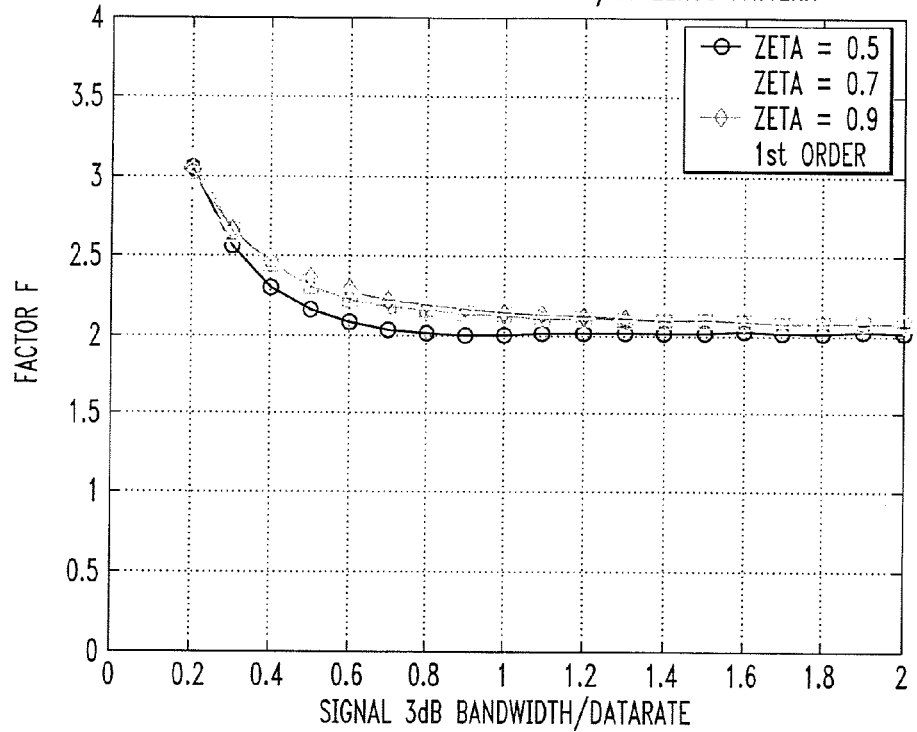
FIGS. 5A and 5B are diagrams showing the optimum value of factor F as a function of signal bandwidth and filter shape using two lengths of square wave patterns.
Figure 5B:
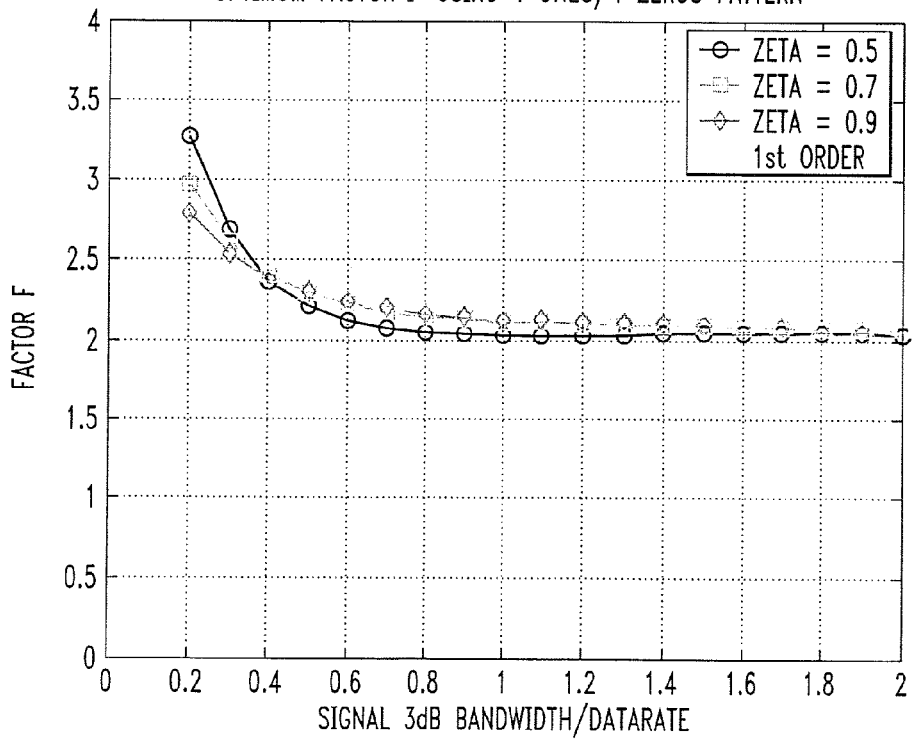

FIGS. 5A and 5B show the calculation of the optimum factor F by comparing the RMS value of the signal to the method of calculating OMA defined in the 10G Ethernet. The 10G Ethernet Standard specifies that a variable length square wave, with periods ranging from 8 to 22 bits, can be used to determine the OMA. Therefore, both extremes were calculated in FIGS. 5A and 5B. In these curves, the optimum value for F approaches two as the signal bandwidth increases and more closely resembles an ideal square wave pattern. For lower signal bandwidths, the optimum value for F goes up as expected.

Note that since the 10G Ethernet Standard specifies this variable length square wave, the measurement of the OMA as defined in the Standard will vary depending on the period of the square wave that is chosen. This was investigated using the same set of filters as described above. It was found that for system bandwidths as low as 0.3 of the data rate, the range of square wave periods results in a 5% variation in the measured OMA. That is, two people could measure the OMA on the same signal using different extremes of the Standard and arrive at values that are 5% apart.

The curves shown in FIGS. 5A and 5B can be used to select a reasonable value for the factor F for a given implementation of this invention. For example, if the photodetector 102 has a 10 GHz bandwidth and is used in an instrument that measures 10 Gb/s signals, then it is reasonable to assume that the overall signal bandwidth, which will be filtered by the photodetector, would likely have a bandwidth in the range of 7-10 GHz for most cases. From the graph, a good choice for the factor F would be 2.1, since this would induce a worst case error of +7% and −5% compared to an OMA measurement using a square wave with a 22 bit period. The error range reduces to +6% and −2% when using an 8 bit period square wave.

A preferred OMA meter implementation of the invention has a calibrated photodetector, an RF power sensor and a processor fully contained in a battery operated hand held sized box.

Alternatively, an OMA meter implementation of the invention can include a calibrated photodetector, an RF meter, and a look-up table. That is, rather than using a processor to determine OMA results via real-time calculations, the OMA results can be previously calculated for given RMS values with the results provided in accordance with a look-up table. Thus, a user of the meter can obtain the RMS signal power from the RF power meter and determine the OMA value by consulting the look-up table which has an OMA value associated with that RMS value. Further, a user familiar enough with repetitively-measured RMS values may simply recall the corresponding OMA value without consulting the look-up table. By way of example, the look-up table may be printed on the meter or available via a display or some other output mechanism associated with the OMA meter.

Furthermore, the OMA meter could have inputs for the photodetector responsivity at several discrete wavelengths or could have the entire responsivity curve stored in memory with inputs only for wavelength.

As mentioned above, the dynamic range of the OMA meter could be extended through the use of amplifiers and/or attenuators or even a variable gain amplifier. The gain of any amplifier or loss of any attenuator would be taken into account in the OMA calculation.

Still further, since the OMA meter of the invention has the capability of measuring the DC optical power, a separate optical power meter would not be required in the field.

The OMA meter (processor) could store acceptable OMA ranges for the various standards and provide a pass/fail indicator to the field engineer. Such a unit would also possess the ability to be updated as new standards are generated, older standards are revised or custom (e.g., company or vendor-specific) limits are adopted.

To further lower cost, the bandwidth of the photodetector and power sensor could be deliberately set low, or chosen to be low, and an appropriate factor relating RMS to OMA chosen using the curves shown in FIGS. 5A and 5B.

A different factor could be applied to convert from RMS to OMA when the data signal does not contain a nearly equal distribution of ones and zeros or the data signal is not an NRZ format such as return-to-zero (RZ).

The input to the photodetector does not have to be fiber coupled. Free Space coupling using optical elements could be employed.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of measuring an optical modulation amplitude (OMA) value associated with an input signal, comprising the steps of:
applying the input signal to a photodetector, wherein the photodetector is calibrated to have a given responsivity value R, and further wherein the photodetector generates an output signal in response to the input signal;
applying the output signal from the photodetector to a radio frequency (RF) power meter, wherein the RF power meter measures the root mean squared (RMS) power value of the output signal received from the photodetector; and
determining the OMA value associated with the input signal in response to the root mean squared (RMS) power value measured by the RF power meter;
wherein the step of determining the OMA value in response to the RMS power value comprises:
determining an RMS signal current based at least in part on the RMS power value;
determining a peak current based at least in part on the RMS signal current and a factor F; and
determining the OMA value based at least in part on the peak current and the responsivity value R of the photodetector.

2. The method of claim 1, wherein the input signal is applied to the photodetector from a fiber optic link.

3. The method of claim 1, wherein the photodetector generates a photocurrent in response to the input signal.

4. The method of claim 3, wherein the photocurrent is converted to an average optical power value based on the given responsivity value R.

5. The method of claim 4, further comprising the step of determining an extinction ratio based on the average optical power value and the OMA value.

6. The method of claim 1, wherein the step of determining the OMA value in response to the RMS power value further comprises converting the RMS power value to the OMA value.

7. The method of claim 6, wherein the RMS power value is converted to the OMA value through an equation:

$$OMA = 10*\log 10\left(\frac{F*\sqrt{\left(0.001*10^{\left(\frac{RF_{RMS}}{10}\right)}/50\right)}}{R*0.001}\right).$$

wherein F represents a predetermined factor and $RF_{RMS}$ represents the measured RF RMS power in units of dBm.

8. The method of claim 7, wherein the portion of the equation under the radical converts the measured RF RMS power, $RF_{RMS}$, from dBm into the square of the RMS signal current, $I_{RMS}^2$, the RMS signal current is then converted to the peak current, $I_{PEAK}$, by multiplying by the factor F, the peak current is converted to a linear OMA value by dividing by the responsivity value R of the photodetector, and the linear OMA is finally converted to the OMA value in units of dBm by dividing by one milliWatt and taking 10-log.

9. The method of claim 1, wherein the factor F is derived from a relationship between an amplitude of a data signal and an RMS value of the data signal.

10. The method of claim 1, wherein the input signal is compatible or verified with at least one of a Fibre Channel (FC) standard and a 10 Gigabit/second Ethernet standard.

11. The method of claim 1, wherein the OMA value is compatible or verified with at least one of a Fibre Channel (FC) standard and a 10 Gigabit/second Ethernet standard.

12. The method of claim 1, wherein the photodetector comprises a photodiode.

13. The method of claim 1, wherein the step of determining the OMA value is performed in accordance with a processor or a look-up table.

14. Apparatus for measuring an optical modulation amplitude (OMA) value associated with an input signal, comprising:
a photodetector for receiving the input signal, wherein the photodetector is calibrated to have a given responsivity value R, and further wherein the photodetector generates an output signal in response to the input signal;
a radio frequency (RF) power meter, operatively coupled to the photodetector, wherein the RF power meter measures the root mean squared (RMS) power value of the output signal received from the photodetector; and
means for determining the OMA value associated with the input signal in response to the root mean squared (RMS) power value measured by the RF power meter;
wherein the means for of determining the OMA value in response to the RMS power value comprises:
means for determining an RMS signal current based at least in part on the RMS power value;
means for determining a peak current based at least in part on the RMS power value signal current and a factor F; and
means for determining the OMA value based at least in part on the peak current and the responsivity value R of the photodetector.

15. The apparatus of claim 14, wherein the determining means comprises a processor.

16. The apparatus of claim 14, wherein the determining means comprises a look-up table.

17. The apparatus of claim 14, further comprising a portable housing for containing the photodetector, the RF power meter and the determining means.

18. The apparatus of claim 14, wherein the photodetector comprises a photodiode.

19. An article of manufacture for measuring an optical modulation amplitude (OMA) value associated with an input signal, comprising a machine readable medium containing one or more programs which when executed implement the step of:
in response to the application of the input signal to a photodetector, wherein the photodetector is calibrated to have a given responsivity value R, and further wherein the photodetector generates an output signal in response to the input signal, and application of the output signal from the photodetector to a radio frequency (RF) power meter, wherein the RF power meter measures the root mean squared (RMS) power value of the output signal received from the photodetector;
determining the OMA value associated with the input signal in response to the root mean squared (RMS) power value measured by the RF power meter;
wherein the step of determining the OMA value in response to the RMS power value comprises:
determining an RMS signal current based at least in part on the RMS power value;
determining a peak current based at least in part on the RMS signal current and a factor F; and determining the OMA value based at least in part on the peak current and the responsivity value R of the photodetector.

20. A method of measuring an optical modulation amplitude (OMA) value associated with an input signal, comprising the steps of:
obtaining the input signal; and
determining the OMA value associated with the input signal by converting a root mean squared (RMS) power value measured from the input signal as a function of a factor F, wherein an optimum value for the factor F is a value which when used to convert from RMS power to OMA gives an OMA value that is in substantial agreement with an OMA value that would have been obtained using a standards-specified method;
wherein the step of determining the OMA value comprises:
determining an RMS signal current based at least in part on the RMS power value;
determining a peak current based at least in part on the measured RMS signal current and the factor F; and
determining the OMA value based at least in part on the peak current and a responsivity value R.

* * * * *